(12) United States Patent
Inamoto et al.

(10) Patent No.: US 8,040,386 B2
(45) Date of Patent: Oct. 18, 2011

(54) IMAGE PROCESSING APPARATUS, IMAGE PROCESSING METHOD, PROGRAM, AND RECORDING MEDIUM

(75) Inventors: Hirohisa Inamoto, Kanagawa (JP); Koji Kobayashi, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 780 days.

(21) Appl. No.: 12/081,356

(22) Filed: Apr. 15, 2008

(65) Prior Publication Data

US 2008/0279480 A1 Nov. 13, 2008

(30) Foreign Application Priority Data

May 9, 2007 (JP) ................................ 2007-124467

(51) Int. Cl.
*H04N 5/228* (2006.01)
(52) U.S. Cl. ............ 348/222.1; 348/240.99; 348/333.02
(58) Field of Classification Search ............... 348/222.1, 348/240.2, 333.02, 333.05
See application file for complete search history.

(56) References Cited

U.S. PATENT DOCUMENTS

| 7,412,155 B2 * | 8/2008 | Kasai ............................. 386/248 |
| 7,843,494 B2 * | 11/2010 | Uemura et al. ............. 348/222.1 |
| 2003/0063322 A1 * | 4/2003 | Itoh et al. ....................... 358/302 |

FOREIGN PATENT DOCUMENTS

| JP | 2006-005640 | 1/2006 |
| JP | 2006-155281 | 6/2006 |

OTHER PUBLICATIONS

C. Cortes and V.N. Vapnik: "Support-Vector Networks", Machine Learning, vol. 20, Kluwer Academic Publishers, Boston, pp. 273-297, 1995.
N. Otsu and T. Kurita: "A New Scheme for Practical, Flexible and Intelligent Vision Systems", Proc. IAPR Workshop on Computer Vision, pp. 431-435, 1988.

* cited by examiner

*Primary Examiner* — Gevell Selby
(74) *Attorney, Agent, or Firm* — Harness, Dickey & Pierce, P.L.C.

(57) ABSTRACT

An image processing apparatus capable of automatically adjusting the enlargement ratio and the position of images and to display the noticed areas of all selected images is disclosed. When a two image display mode is selected, an image previously displayed (a first image) and an image to be displayed in the two image display mode (a second image) are loaded from a memory into a display controlling unit and a correction value calculating unit. The display controlling unit performs enlarging and moving operations with respect to the first image and the second image simultaneously. The correction value calculating unit searches for an area in the second image (a corrected area) most resembling an enlarged area in the first image so as to enlarge the corrected area in the second image. The images processed by the display controlling unit are transmitted to an image display memory.

18 Claims, 14 Drawing Sheets

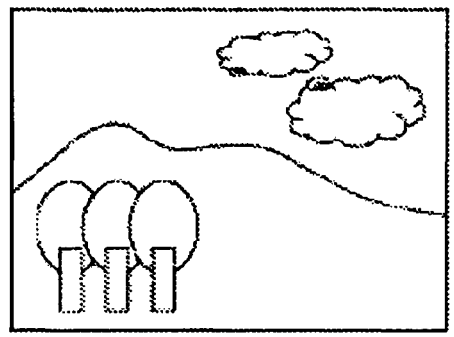
FIG.3A
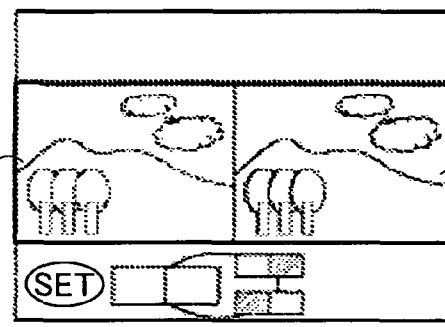
FIG.3B — FIRST DISPLAY AREA, SECOND DISPLAY AREA
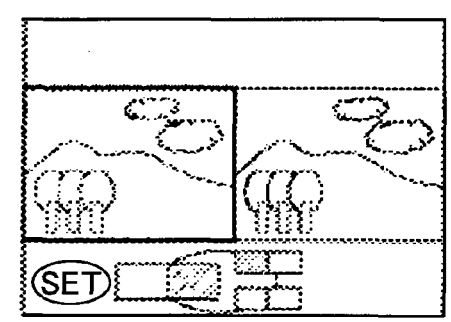
FIG.3C
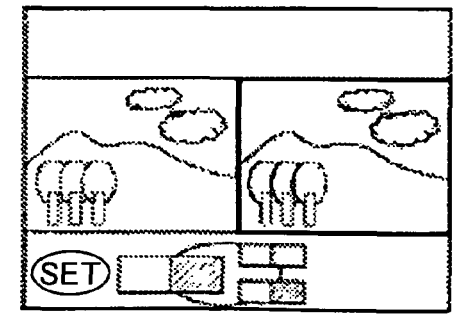
FIG.3D
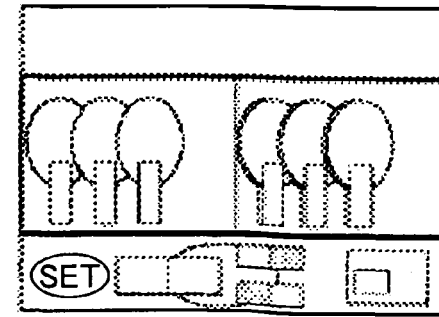
FIG.3E

FIG.9
ROOT
OTHER
DOCUMENT
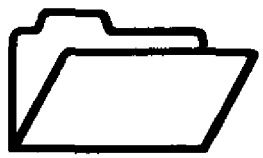
ID0001
ID0002

FIG.10

IMAGE PROCESSING APPARATUS, IMAGE PROCESSING METHOD, PROGRAM, AND RECORDING MEDIUM

BACKGROUND OF THE INVENTION

1. Field of the Invention

The present invention generally relates to a digital image processing apparatus, and more specifically to a technique preferably adapted to software for a printer, a facsimile machine, a digital camera, a personal computer, and the like.

2. Description of the Related Art

Recently, the image resolution of image input devices such as a flat bed scanner and a digital camera has been remarkably improved. However, the image resolution of display devices displaying the images input by such input devices is not so high as that of the input devices. For example, there are so many digital cameras having resolutions of 4 through 5 million pixels, but the resolutions of liquid crystal displays for personal computers are still 1.3 million pixels for SXGA and 2 million pixels for UXGA. Further, the resolution of a liquid crystal display attached to a digital camera is even lower. As a result, the resolution of an image input by an image input device needs to be reduced when viewed on a display.

Unfortunately, when the image is viewed with reduced resolution, necessary information may not be obtained in many cases. For example, a case where a picture of a person is taken with a digital camera is considered. When pictures are taken, plural same pictures may be taken to get a best shot. However, in typical use of such a digital camera, since the data storage capacity of the camera is limited, the user is more likely to delete some unnecessary plural pictures when the capacity is running out. In this case, the user may view the attached liquid crystal display to select pictures to be deleted. Unfortunately, there may be many cases where the eyes of the person are closed when the pictures are viewed on a display of a personal computer. To avoid such problems, there may be a method of enlarging a part of a picture that has been shrunk. However, there is a problem that it is very troublesome to perform the same operations of enlarging and moving with respect to plural pictures.

To solve the problem, Patent Document 1 discloses a technique in which selected plural images are displayed on the same display; when enlarge, shrink, and move operations are performed on one of the plural pictures, the same operations are also applied to the other pictures displayed on the display. By doing this, it is possible to determine whether the eyes of the person are closed with fewer operations. In addition, it is not to hard to anticipate that this technique of Patent Document 1 is useful when applied to a document image scanned by a flat bed scanner. For example, when this technique is applied to document images viewed as the same document when viewed in a list in a thumbnail grid mode, it is possible to effectively view a selected part of each document where important information is included.

Patent Document 1: Japanese Patent Application Publication No. 2006-5640

Non Patent Document 1: 1C. Cortes and V. N. Vapnik "Support Vector Networks," Machine Learning, vol. 20, pp. 273-297, 1995

Non Patent Document 2: N. Otsu, and T. Kurita, "A new scheme for practical, flexible and intelligent vision system," Proc. IAPR Workshop on Computer Vision, pp. 431-435, 1988.

However, it is not necessarily the case that all the document images scanned by a flat bed scanner have exactly the same layout.

As an example, FIGS. 1A through 1D illustrate such a case where a snapshot (picture) of a person is taken. FIG. 1A is a first picture of the person. As shown in FIG. 1A, the person is displayed in the center of the picture. FIG. 1B is an enlarged image of the area surrounded by the rectangle in FIG. 1A. After a few seconds, a next picture is taken to get a best shot. FIG. 1C is a second picture of the person. As shown in FIG. 1C, the person is moved to the left-hand side of the picture. Now, FIG. 1D is another enlarged image of the area surrounded by the rectangle in FIG. 1C. The positions of the rectangles in FIGS. 1A and 1C are the same with respect to the corresponding pictures. As a result, as shown in FIG. 1D, the face of the person is not included in FIG. 1D. In such a case like this, it is necessary to slightly adjust the enlarged (noticed) area so as to see the face of the person as shown in FIG. 1B. As described, there may be cases where necessary information is not included in the same noticed areas when the position is slightly moved among plural pictures.

The above case may be relatively extreme because the person is moved a large distance from the center position, and the above case may not be likely to occur in a typical photo shoot. However, when an enlargement factor is large, that is, when the noticed area is relatively small compared with the original image including the noticed area, the same problem as described above may occur. For example, a display device attached to a typical digital camera is very small. Therefore, to check an image on the display device carefully, the image is required to be sufficiently enlarged. As another example, there may be a case where the face of a person is very small when, for example, a group of people are included in a picture. In such a case, it is also required to sufficiently enlarge the necessary area of the picture. When these cases are considered, a camera shaking in a photo shoot may become a serious mistake in the photo shoot.

SUMMARY OF THE INVENTION

The present invention is made in light of the above problems, and may provide an image processing apparatus, an image processing method, a program, and a recording medium capable of simultaneously displaying partially enlarged plural images on a display, and for an operation such as changing the enlargement factor and moving the noticed area in one of the plural images, automatically performing the same operation performed in the one of the plural images, displaying the noticed areas of the all images, and improving the usability.

According to an aspect of the present invention, there is provided an image processing apparatus including an image input unit inputting an image; a recording unit recording an image input by the input image unit; a display unit displaying an image signal recorded in the recording unit; a first display controlling unit simultaneously performing a process selected from the group including enlarging an image and moving an image with respect to specific plural images displayed on the display unit; and a correction value calculating unit calculating a correction value with respect to a process in the first display controlling unit in accordance with the selected process; wherein a process in the first display controlling unit is corrected in accordance with the correction value.

According to an aspect of the present invention, there are some advantages as describes below:

(1): In a system where some of partially enlarged images of the corresponding plural images are simultaneously displayed on a display, and when a user changes an enlarge rate and moves a scope range with respect to one image, the same operations are performed with respect to the other images, and the enlarging operation and the moving operation are automatically performed with respect to the other images. As a result, a user can look at each notice area of all images, thereby improving the convenience of use.

(2): In a system where some of thumbnail images of plural images and the thumbnail's partially enlarged images are simultaneously displayed on a display, and when a user changes an enlarge rate and moves a scope range with respect to one image, the same operations are performed with respect to the other images, the enlarging operation and the moving operation are automatically performed with respect to the other images. As a result, a user can look at each notice area of all the images, thereby improving the convenience of use.

(3): Since a user can change the enlarge rate and move a scope range, a user can set a notice range as the user likes, thereby improving the convenience of use.

(4): A user can grasp the entire contents of an image by arranging a thumbnail and the thumbnail's partially enlarged image side by side, thereby improving the convenience of use.

(5): For a part of an image having higher probability that a user would like to check it, the user is automatically prompted to check it, thereby reducing the operations of the user and improving the convenience of use.

(6): Since an image to be simultaneously browsed as a resembled image is previously searched for and extracted from images stored in a recording device and is displayed to a user, the convenience of use is improved.

(7) Since a type of an image is determined, classified, and stored in a recording device in advance, efficiency of searching for an image is increased and the convenience of use is improved.

(8) Since a display mode of browsing a file is switched depending on the type of the file, the file can be more effectively browsed and the convenience of use is improved.

(9) Since the type of an image is determined before a similarity level is determined, the frequency of determining the type of image is reduced, thereby increasing the processing speed.

(10) Since not only position correction information but also resolution correction information are calculated and used, a user doesn't have to pay attention to resolution setting when an image is input, thereby improving the convenience of use.

(11) Since an entirely shrunk image and a partially enlarged image are displayed side by side, a user can easily recognize the entire contents of an image, thereby improving the convenience of use.

(12) Since a user can directly perform operations on a rectangle indicating an enlarged area using a pointing device when an image partially enlarged from a part of an image and an image shrunk from an entire image are displayed side by side, the user can intuitively perform operations, thereby improving the convenience of use.

BRIEF DESCRIPTION OF THE DRAWINGS

Other objects, features, and advantages of the present invention will become more apparent from the following descriptions when read in conjunction with the accompanying drawings, in which:

FIGS. 3A through 3E illustrate a play mode;
FIG. 9 shows an exemplary folder configuration;
FIG. 10 shows a display example displayed according to the second embodiment of the present invention.

DETAILED DESCRIPTION OF THE PREFERRED EMBODIMENTS

In the following, exemplary embodiments of the present invention are described with reference to the accompanying drawings.

Embodiment 1

Figure 1B:
FIGS. 1A through 1D illustrate a conventional problem.
Figure 1D:
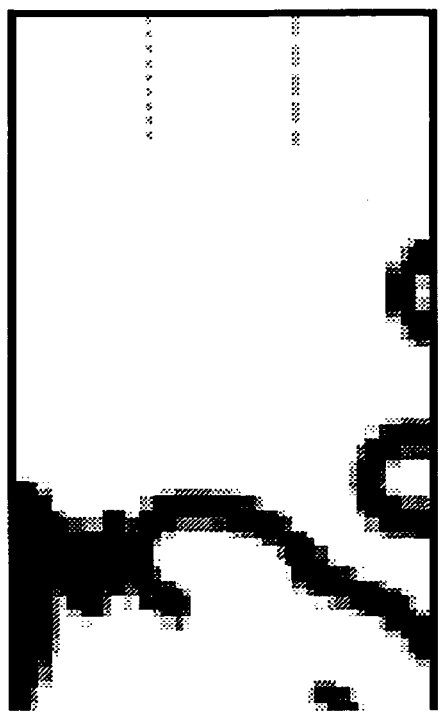
Figure 1A:
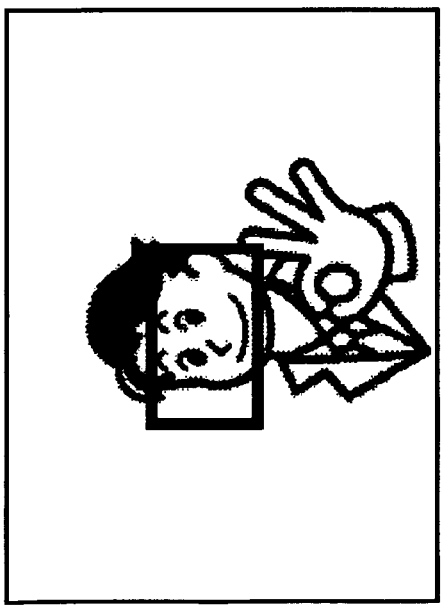
Figure 1C:
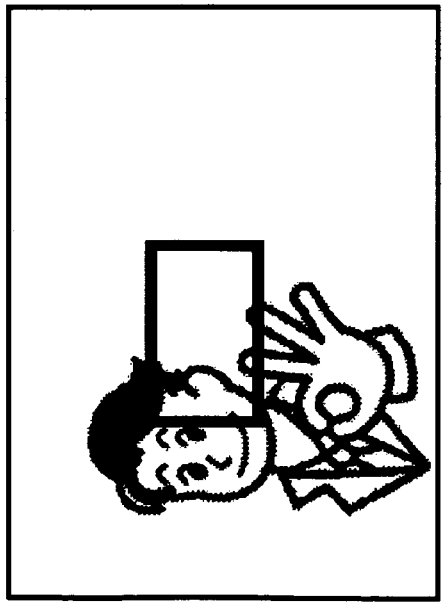
Figure 2:
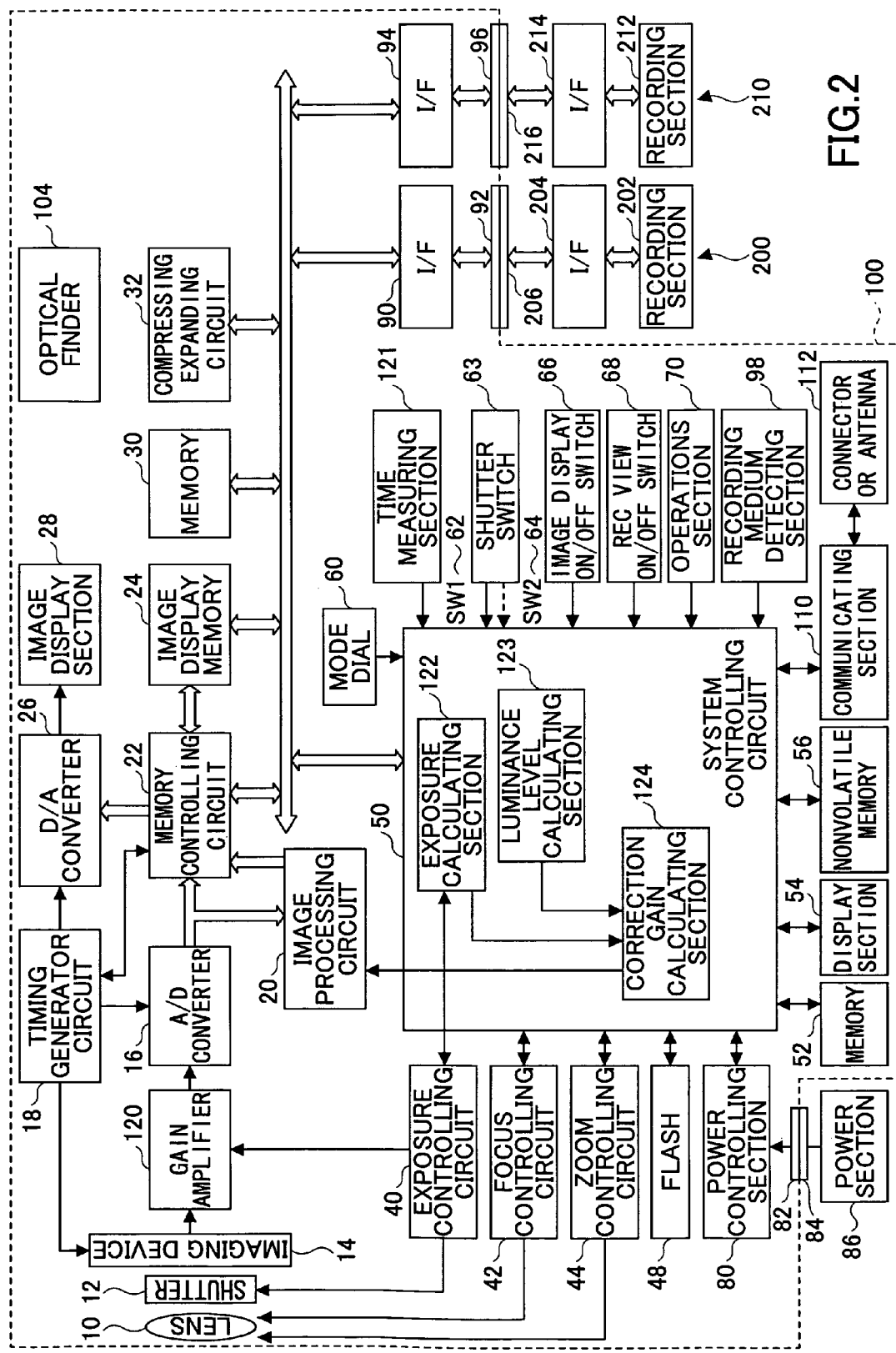
FIG. 2 is a drawing showing an exemplary configuration of a digital camera according to an embodiment of the present invention.

FIG. 2 shows a configuration of an image processing apparatus (a digital camera) 100 according an embodiment of the present invention.

As shown in FIG. 2, the image processing apparatus 100 includes a shooting lens 10, a shutter 12, an imaging device 14, an A/D converter 16, a timing generator circuit 18, an image processing circuit 20, a memory controlling circuit 22, an image display memory 24, a D/A converter 26, an image display section 28, a memory 30, a compressing expanding circuit 32, an exposure controlling circuit 40, a focus controlling circuit 42, a zoom controlling circuit 44, a flash 48, a system controlling circuit 50, a memory 52, a display section 54, a nonvolatile memory 56, a mode dial 60, a shutter switch 63, an image display ON/OFF switch 66, a REC view ON/OFF switch 68, an operations section 70, interfaces 90 and 94, a recording medium detecting section 98, an optical finder 104, a communicating section 110, a gain amplifier 120, and a time measuring section 121.

The shutter 12 has an aperture function. The imaging device 14 converts an optical image into an electronic signal. The gain amplifier 120 amplifies an analog signal output from the imaging device 14 to determine the sensitivity of the camera. The A/D converter 16 converts the analog signal output from the imaging device 14 into a digital signal.

The timing generator circuit 18 provides a clock signal and a control signal for the imaging device 14, the A/D converter 16, and the D/A converter 26. The timing generator circuit 18 is controlled by the memory controlling circuit 22 and the system controlling circuit 50. The image processing circuit 20 performs prescribed pixel interpolation and color conversion processes with respect to the data from the A/D converter 16 or data from the memory controlling circuit 22. Further, the image processing circuit 20 performs a prescribed calculation process using imaged image data. Based on the obtained calculation result, the system controlling circuit 50 controls the exposure controlling circuit 40 and the focus controlling circuit 42 to perform a TTL(Through-The-Lens)-type AF(Auto Focus) process, an AE(Auto Exposure) process, and an EF(pre-Exposure Flash) process.

Still further, after performing a prescribed calculation using the imaged image data, the image processing circuit 20 performs a TTL-type AWB (Auto White Balance) process based on the obtained calculation result.

The memory controlling circuit 22 controls the A/D converter 16, the timing generator circuit 18, the image processing circuit 20, the image display memory 24, the D/A converter 26, the memory 30, and the compressing expanding circuit 32. Data output from the A/D converter 16 are stored in the image display memory 24 or the memory 30 via the image processing circuit 20 and the memory controlling circuit 22, or via the memory controlling circuit 22 only.

The system controlling circuit 50 includes an exposure calculating section 122, a luminance level calculating section 123, and a correction gain calculating section 124. The exposure calculating section 122 calculates an appropriate exposure value based on a measured luminance level of TTL light via the memory controlling circuit 22, and controls the exposure controlling circuit 40. The luminance level calculating section 123 calculates a luminance level from the imaged image data via the memory controlling circuit 22. The correction gain calculating section 124 compares the luminance level measured by the exposure calculating section 122 with the luminance level calculated by the luminance level calculating section 123, and calculates an offset value so that the luminance level is appropriate. Then, based on the offset value, the image processing circuit 20 produce a digital gain correction value.

The image display section 28 is made of, for example, a TFT LCD. Image data to be displayed stored in the image display memory 24 are transmitted to the image display section 28 via the D/A converter 26, and displayed on the image display section 28. An electronic finder function can be realized when the imaged image data are sequentially displayed on the image display section 28.

The display on the image display section 28 can be turned ON/OFF by an instruction from the system controlling circuit 50. When the display is turned OFF, power consumption of the image processing apparatus 100 can be greatly reduced. It should be noted that the system controlling section 50 performs as an image display controlling unit controlling, for example, a display status of the image display section 28. The memory 30 stores input still images and moving images, having sufficient capacity for storing a prescribed number of still images and a prescribed time period of moving images. As a result, a large of amount image data, for example, a sequential shooting pictures in a sequential shooting mode and a panoramic picture in a panoramic shooting mode, can be stored in the memory 30 quickly. Further, the memory 30 can also be used as a working area of the system controlling circuit 50.

The compressing expanding circuit 32 compresses and expands image data by, for example an ADCT(Adaptive Discrete Cosine Transform) method. The compressing expanding circuit 32 reads image data in the memory 30 and compresses or expands the read image data, and stores the compressed or expanded image data in the memory 30. The exposure controlling circuit 40 controls the shutter 12 having an aperture function, and can adjust the amount of light in cooperation with a flash 48.

The focus controlling circuit 42 controls the focus of the shooting lens 10. The zoom controlling circuit 44 controls the zoom of the shooting lens 10. The exposure controlling circuit 40 and the focus controlling circuit 42 are controlled by the system controlling circuit 50 based on a calculation result of the imaged image data from a TTL light by the image processing circuit 20. The system controlling circuit 50 controls the entire image processing apparatus 100. The memory 52 stores, for example, constant numbers, variable numbers, and programs.

The display section 54 includes a liquid crystal display device and a speaker providing messages about the operating status using characters, images, and sound in accordance with the execution of a program. One or more display sections 54 are provided at easily viewed locations near the operations section 70. The display section 54 includes a combination of, for example, an LCD, an LED, and a voice device. Some part of the display section 54 is provided in the optical finder 104.

The display contents displayed on the LCD and the like of the display section 54 include a single shot/sequential shooting mode, a self-timer, a compression rate, the number of recording pixels, the number of recorded images (pictures), the number of recordable pictures, shutter speed, aperture value, exposure correction, a flash mode, a red-eye reduction mode, a macro shooting mode, a buzzer setting mode, remaining battery power for clock, remaining battery power, an error message, information display in plural digits, status whether recording media 200 and 210 are attached, operating status of communication I/F, and date and time.

The display contents displayed on the optical finder 104 among the entire display contents of the display section 54 include focused status, camera shake alarm, flash charged status, shutter speed, aperture value, and exposure correction. The nonvolatile memory 56 is electrically-erasable and electrically-writable memory such as an EEPROM.

To operate the image processing apparatus 100, the mode dial 60, a switch SW1 62, the shutter switch 63, a switch SW2 64, the image display ON/OFF switch 66, the REC view ON/OFF switch 68, and the operations section 70 are used. Instructions to operate various functions are given to the image processing apparatus 100 via the system controlling circuit 50. An instruction is given to the image processing apparatus 100 by any single operation of a switch, a dial, a touch panel, pointing by visual sight detection, voice recognition, or a combination of those operations sections. More detailed explanations of those operations sections are given below.

The shutter switch SW1 62 is turned ON when the shutter switch 63 is being operated to give an instruction to start processes such as the AF(Auto Focus) process, the AE(Auto Exposure) process, the AWB(Auto White Balance) process, and the EF(pre-Exposure Flash) process. The shutter switch SW2 64 is turned ON when the operation of the shutter switch 63 is ended. When the shutter switch SW2 64 is turned ON, an instruction is given to start a series of processes including an exposing process, a developing process, and a recording process. In the exposing process, a signal from the imaging device 14 is stored as image data in the memory 30 via the A/D converter 16 and the memory controlling circuit 22. The developing process is performed using calculations by the image processing circuit 20 and the memory controlling circuit 22. In the recording process, the image data are read from the memory 30 and are compressed by the compressing expanding circuit 32. Then the compressed image data are stored in the recording medium 200 or 210.

The image display ON/OFF switch 66 turns ON/OFF the image display section 28. This image display ON/OFF switch 66 allows for cutting off the current supply to the image display section 28 of, for example, a TFT LCD, thereby reducing power consumption.

The REC view ON/OFF switch 68 controls a REC view (quick review) function automatically playing imaged image data right after the shooting. Especially in this embodiment, it is assumed that the REC view function can be performed even when the image display section 28 is turned OFF. The time measuring section 121 can measure a time interval between when the shutter switch SW1 62 is turned ON and when the shutter switch SW2 64 is turned ON.

The operations section 70 includes various types of buttons and a touch panel used as a menu button, a set button, a macro button, a multi images play and page feed button, a flash set button, a single shoot/continuous shoot/self-timer mode selection button, a menu shift (−) button, a menu shift (+) button, a playing image shift (+) button, a playing image shift (−) button, an image quality selecting button, an exposure correction button, and a date/time set button.

The power controlling section 80 includes a battery detecting circuit, a DC-DC converter, and a switching circuit switching a block to be powered up. The power controlling section 80 detects whether a battery is attached, the type of the battery, and remaining energy of the battery. Based on the detection result and an instruction from the system controlling circuit 50, the power controlling section 80 controls the DC-DC converter to supply necessary voltage to each section including the recording medium for a necessary time period.

There is a power section 86 connected to the power controlling section 80 via connectors 82 and 84. The power section 86 includes a primary battery such as an alkaline battery or a lithium battery, a secondary battery such as a NiCd battery, a NiMH battery, or a Li battery, and an AC adaptor.

The recording medium detecting section 98 determines whether a recording medium 200 or 210 such as a memory card or a hard disk is attached to the image processing apparatus 100 via the interface 90 or 94 connected to connectors 92 or 96, respectively, providing connection between the interface and the recording medium.

In this embodiment, it is assumed that the image processing apparatus 100 has two interfaces and two connectors each capable of connecting a recording medium. Obviously, the number of such interfaces and connectors is not limited to two, and the image processing apparatus 100 may include one or more such interfaces and connectors. Further, when plural such interfaces and connectors are provided, the interfaces and connectors may be based on the same or different standards. For example, the interface and the connector conform to a standard such as PCMCIA card and CF (Compact Flash (trademark)) card.

Further, when the interfaces 90 and 94 and the connectors 92 and 96 conform to a standard such as the PCMCIA card or the CF card, by connecting a communication card such as a LAN card, a modem card, a USB card, an IEEE 1394 card, a P 1284 card, a SCSI card, or a communication card for PHS, it becomes possible to exchange image data and management information of the image data with other peripheral devices such as a computer and a printer.

The optical finder 104 allows for shooting using the optical finder 104 even without using an electronic finder function of the image display section 28. On the optical finder 104, some functions of the display section 54 such as focused status, camera shake alarm, flash charged status, shutter speed, aperture value, and exposure correction can be displayed.

The communication section 110 has various communicating functions such as RS 232C, USB, IEEE 1394, P 1284, SCSI, modem, LAN, and wireless communication. Reference numeral 112 denotes a connector when the image processing apparatus 100 is connected to another apparatus via the communication section 100 or an antenna when a wireless communication method is used.

The recording medium 200 may be a memory card or a hard disk and includes a recording section 202 made of, for example, a semiconductor memory or magnetic disks, an interface 204 to the image processing apparatus 100, and a connector 206 to provide connection to the image processing apparatus 100.

The recording medium 210 may be a memory card or a hard disk and includes a recording section 212 made of, for example, a semiconductor memory or magnetic disks, an interface 214 to the image processing apparatus 100, and a connector 216 to provide connection to the image processing apparatus 100.

In the following, a characteristic feature of a configuration according to an embodiment of the present invention in play mode is described in detail. FIG. 3A shows a one image display mode which is the normal play mode. During the one image display mode, when a plural display instruction is issued, the display mode goes to a plural display mode. FIG. 3B shows the plural display mode. In the following, the left-hand side area in a display mode as shown in FIG. 3B is referred to as "a first display area". Similarly, the right-hand side area in the display mode as shown in FIG. 3B is referred to as "a second display area". The plural display mode may be set by pressing or holding down a prescribed button on the operations section 70 of the image processing apparatus 100, or may be selected from a menu display on the image display section 28.

In this description, a case of displaying two images is described for simplicity purposes. However, it should be noted that an embodiment of the present invention is not limited to the case of displaying two images as shown in FIG. 3B. Namely, any number of images may be displayed. Further, as shown in FIGS. 3B through 3E, on the lower side of the display there is provided a toggle mechanism indicating which display is being selected so as to be operated. The display may be selected using the toggle mechanism as shown in FIGS. 3B through 3E. However, a method of selecting the display is not limited to the toggle mechanism. For example, a cross button and a set button may be used to select a display and confirm/cancel the selection of the display, respectively. Otherwise, a touch panel may be used to select a display when an apparatus having a touch panel is used.

In this description, a set button as a toggle switch is used to select a display to be operated on. In the display mode of FIG. 3B, when the set button is pressed once, the selected display is changed into a one image selected mode as shown in FIG. 3C. In any mode, any display operation (including enlarging and moving a display) is effective for the selected window(s) only. In the display mode of FIG. 3C, when the set button is further pressed once, the selected display is changed into another one image selected mode as shown in FIG. 3D. Further, in the display mode of FIG. 3D, when the set button is pressed once, the selected display is changed into a two (plural) image selected mode as shown in FIG. 3E. In this two (plural) image selected mode, for example, both of the selected two (plural) displays can be enlarged and moved simultaneously. After the displays are enlarged, when the display mode is changed into the one image selected mode to display one image, and the other image is selected to be displayed, the selected display has the same enlarged ratio and the moved position in accordance with the enlarged and the moved operations that have been made in the two (plural) image selected mode. Namely, when the next display image is selected, settings of the enlarged ratio and moved position are also applied in the next display image.

Figure 4:
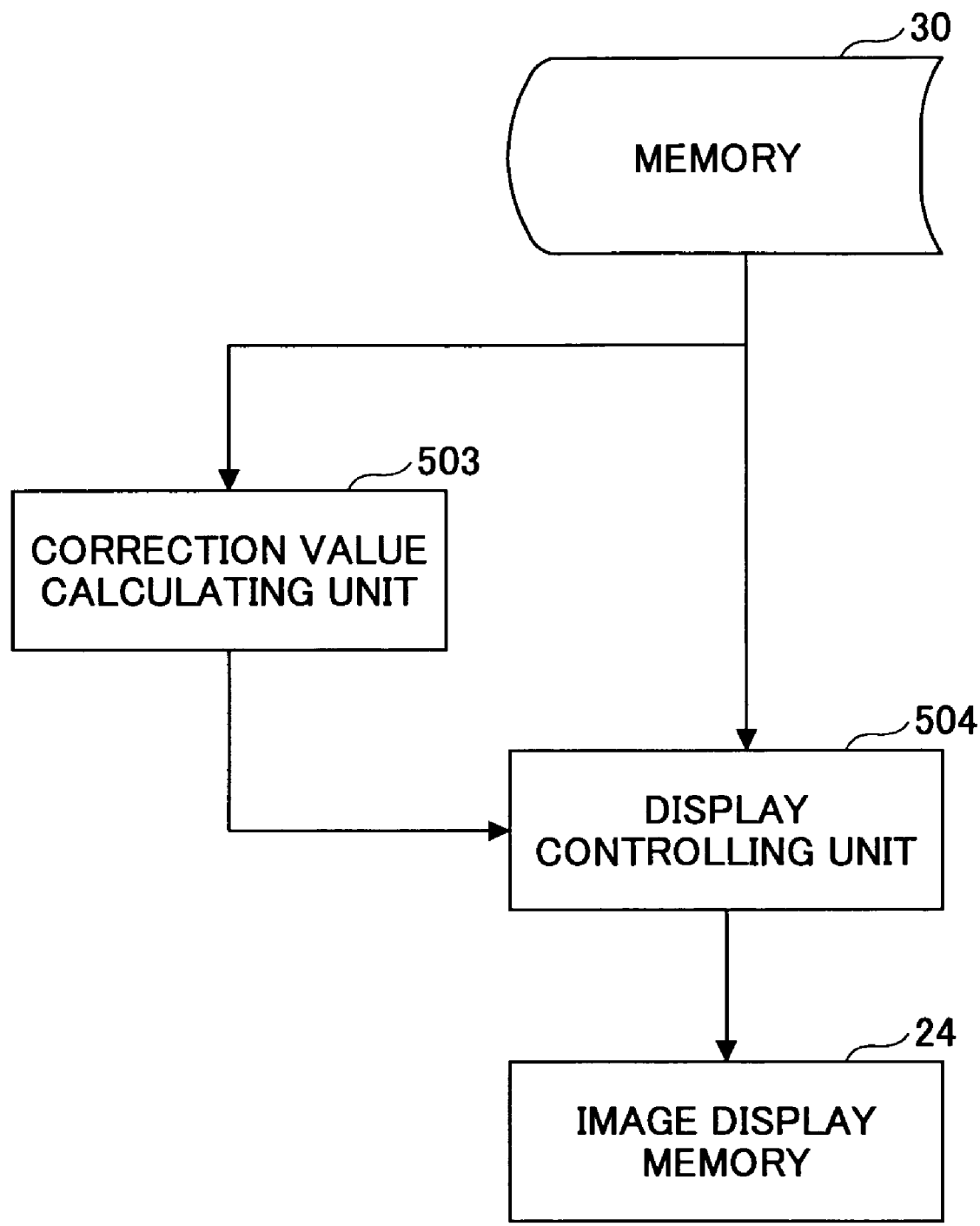
FIG. 4 shows an exemplary partial configuration according to a first embodiment of the present invention.

FIG. 4 is a flowchart showing the above process in detail. When the two image selected mode is selected, image data that have been displayed before the setting (hereinafter referred to as "a first image") and the other data that are not displayed before the setting (hereinafter referred to as "a second image") are read from the memory 30. The image data read from the memory 30 are transferred to a display controlling unit 504 and a correction value calculating unit 503.

In the display controlling unit 504, enlarging and moving operations are performed with respect to both the first and the second images. However, the enlarged area in the first image is not always entirely equal to the enlarged area in the second image. Namely, the enlarged area in the second image is a correct area determined based on correction values calculated in the correction value calculating unit 503.

Figure 5B:
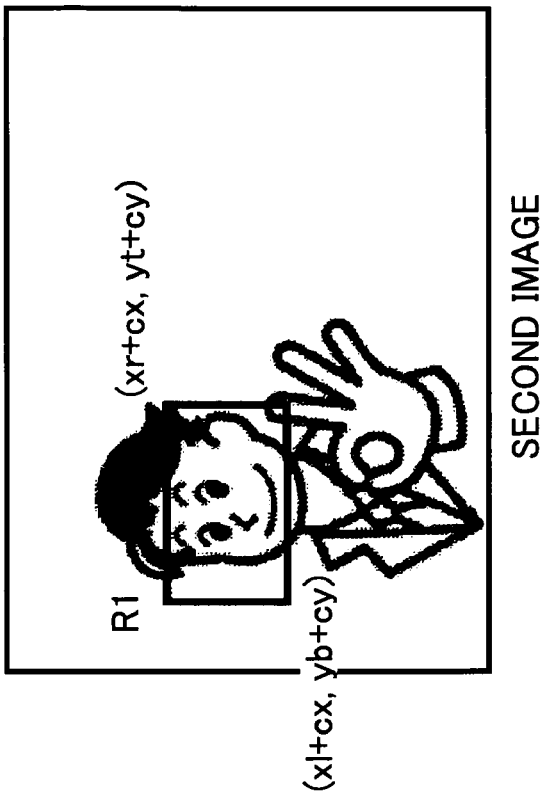
FIGS. 5A and 5B are drawings showing correction values calculated by a correction value calculating unit.
Figure 5A:
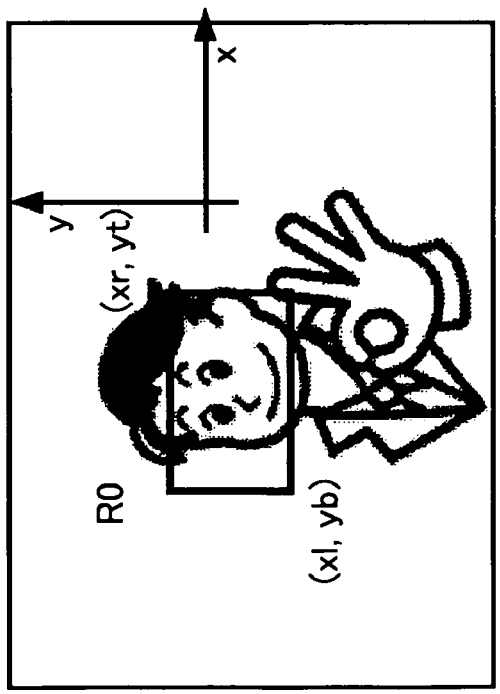

Next, the correction value calculated by the correction value calculating unit 503 is described. FIGS. 5A and 5B show the first and the second images side by side. As shown in FIGS. 5A and 5B, original points are set at the bottom left corner of the first and the second images, and a coordinate system with the right (horizontal) direction set as an x direction and the up (vertical) direction set as a y direction is applied to the first and the second images. A user's operation to enlarge and move an image is equivalent to the user defining a rectangle area to be enlarged. Namely, when the rectangular area to be enlarged in the first image is expressed as "R0", "R0" is given as "(xl, yb, xr, yt)". In the same manner, a rectangular area to be enlarged in the second image "R1" is given as "(xl+cx, yb+cy, xr+cx, yt+cy)". The values "cx" and "cy" are correction values calculated by the correction value calculating unit 503.

In the correction value calculating unit 503, image data included in the rectangular area "R0" in the first image are scanned to search for the rectangular area "R1" so that the image of the rectangular area "R1" resembles the image of the rectangular area "R0" most closely. From a technical point of view, the correction values "cx" and "cy" that maximize a correlation coefficient "C" are given in the following formula 1 by scanning the correction values "cx" and "cy".

$$C = \frac{\sum_{x=x_l}^{x_r} \sum_{y=y_b}^{y_t} I_0(x, y) * I(x + c_x, y + c_y)}{\sqrt{\sum_{x=x_l}^{x_r} \sum_{y=y_b}^{y_t} I_0(x, y)^2 * \sum_{x=x_l}^{x_r} \sum_{y=y_b}^{y_t} I(x + c_x, y + c_y)^2}} \quad (1)$$

In formula 1, "$I_0(x,y)$" denotes a pixel value at (x,y) of the first image in the coordinate system; and "$I(x,y)$" denotes a pixel value at (x,y) of the second image in the coordinate system. It should be noted that the calculation of the correction values is performed only when a user enlarges and moves an image.

The image data processed by the display controlling unit 504 are transferred to the image display memory 24 to be processed as described above and displayed on the image display section 28.

As described above, an area to be enlarged in the second image is searched for so as to maximize the similarity between the image in the area to be enlarged in the first image and the image in the area to be enlarged in the second image. Therefore, even when positions of an object image are different between the first image and the second image, the area designated by a user in the first image to be displayed in the first display area, which is equivalent to an area that the user needs to check, is extracted from the second image, and the extracted image is displayed in the second display area. When this is performed, the user doesn't need to perform fine adjustment, thereby improving the convenience of use.

In the above description, correction values are defined only in x and y directions. However, when the an affine conversion as shown in the following formula 2 is used, corrections in a rotating direction can also be performed easily.

$$\begin{pmatrix} x' \\ y' \end{pmatrix} = \begin{pmatrix} \cos\theta & -\sin\theta \\ \sin\theta & \cos\theta \end{pmatrix} \begin{pmatrix} x \\ y \end{pmatrix} + \begin{pmatrix} c_x \\ c_y \end{pmatrix} \quad (2)$$

In formula 2, "x" and "y" denote coordinate values in a noticed area; "x'" and "y'" denote coordinate values after the conversion; "θ" denotes a rotation angle; and "cx" and "cy" denote moved distances in x and y directions, respectively, by the conversion.

Further, in the above description, the correction values are calculated when a first enlarge and move operation is performed. However, correction values may be calculated whenever an enlarge and moving operation is performed, or whenever a user presses a button assigned to the function.

Next, a case is considered where the first enlarging and moving operation is performed in the one image selected mode, then the display mode is changed to the two (plural) image selected mode, where the second enlarging and moving operation is performed. In such a case, before starting the second enlarging and moving operation, the enlarged ratio and the positions of an object image among the two (plural) images may be different from each other. In this case, the second enlarging and moving operation is applied to the two (plural) images that are being displayed just before the second enlarging and moving operation. For example, there are two images: one image is enlarged at an enlargement ratio of 1 and the other image is enlarged at an enlargement ratio of 2. Then those two images are displayed side by side in the two (plural) image selected mode, and an operation to enlarge at an enlargement ratio of 2 is simultaneously applied to the two images. Then, a two-times enlarged image and a four-times enlarged image are obtained. However, when the result of an operation would exceed the limit of the enlarging and moving operation, the operation will not be performed. Next, a case is considered where there are two images; one is a vertically-long image and the other is a horizontally-long image. When those two images are displayed side by side in the two (plural) image mode, and the enlarging operation is performed on those two images, the enlarged images will also be a vertically-long image and a horizontally-long image the same as before the operation. It should be noted that there is no difference in operations between a vertically-long image and a horizontally-long image. When a next image is to be displayed in accordance with the enlarged ratio and the position of an object image of the current displayed image is unchanged but the next image is a vertically-long image and the current image is a horizontally-long image or vice versa, the next image will be displayed substantially in accordance with the enlarged ratio and the position of an object image.

The system controlling circuit 50 can exchange the positions of the selected two images by using an operation button on the operations section 70 or making a selection on a menu. Further, a histogram of pixels being displayed and a white flight area can be displayed by using an operation button on the operations section 70 or making a selection on a menu.

The system controlling circuit 50 can select one or more images being displayed and delete the selected images. In this operation, conversely, it may be arranged that only an unselected one or more images are deleted. In the same manner, it is possible to select one or more images being displayed and set protection for the selected images; and it is also possible to select one or more images being displayed as print target images to be directly printed out by an external output device connected to the image processing apparatus (digital camera) 100.

An image displaying method and a displayed image operating method used in an image play mode of a digital camera according to an embodiment of the present invention as described above may also be executed in the two (plural) image selected (displayed) mode on a "REC view hold". The "REC view" is a function to automatically display shot image data that have just been shot on the image display section 28 for a certain period of time. Normally, right after image shooting, the shot image data stored in the image display memory 24 or the memory 30 are read back to be displayed on the image display section 28. The "REC view hold" refers to a function to keep on executing the REC view function when a button for holding the REC view on the operations section 70 is pressed during the REC view period, and the REC view function is terminated when a button for terminating the REC view is pressed.

In the description of an embodiment of the present invention, two (plural) resembling images are displayed on the image display section 28 and are enlarged and moved simultaneously to be compared to each other. As two (plural) images to be compared to each other displayed during the "REC view hold" mode, bracket images shot in a bracket shooting mode, all the sequential images shot in a sequential shooting mode, or all images shot in a certain period of time in the normal shooting mode are typically used. The group of images may be displayed in a manner that all images are displayed in a two (plural) image display mode or only a prescribed number of images are displayed in each display step.

Figure 6:
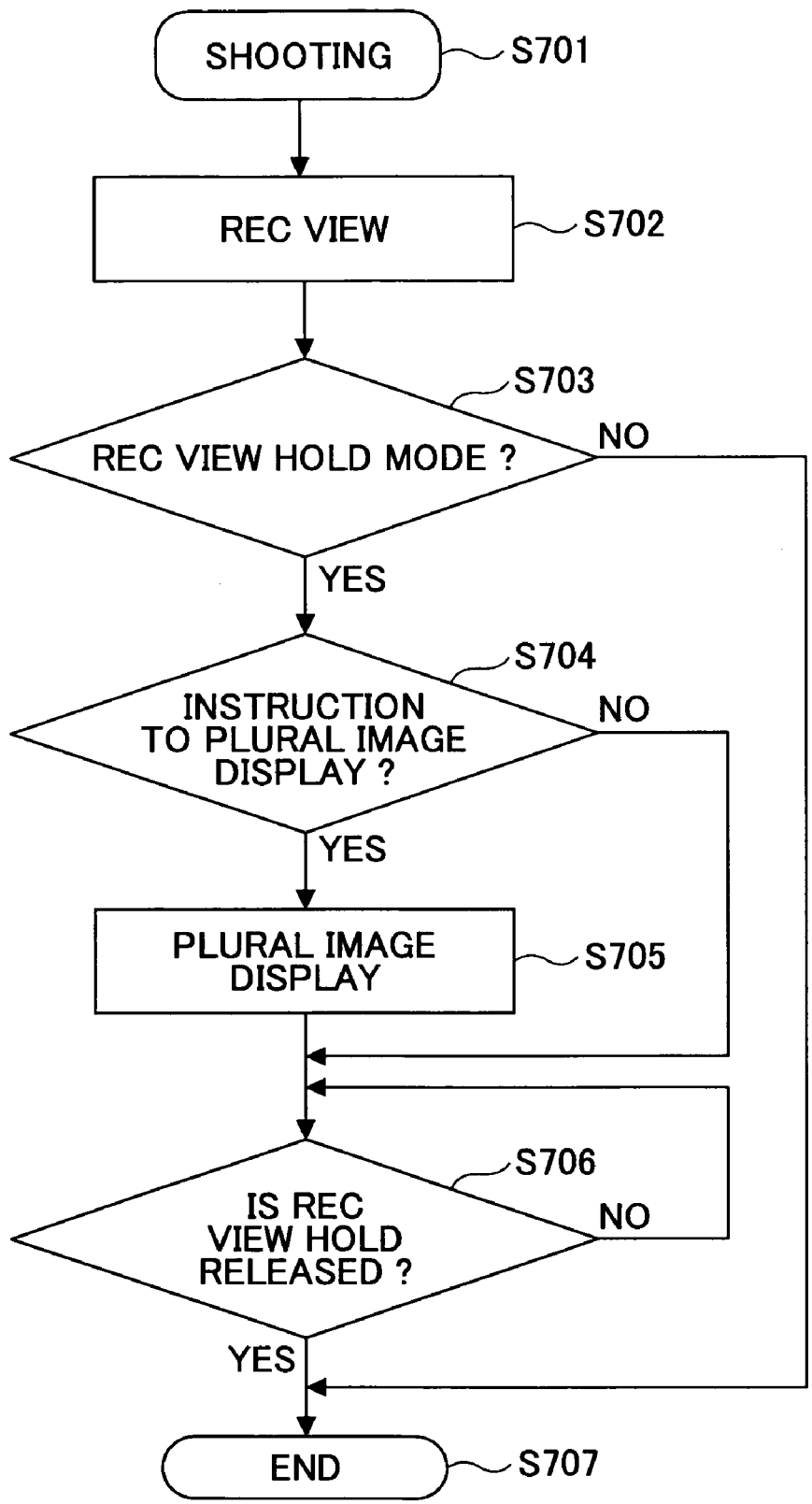
FIG. 6 is a flowchart showing a process of simultaneously displaying plural images in a REC view hold mode.

FIG. 6 is a flowchart showing an operational process of displaying two (plural) images in the "REC view hold" mode.

First, as soon as a shooting starts (step S701), a REC view display displaying the shot image data on the image display section 28 is performed (step S702). While the REC view display is being performed, it is determined whether the REC view hold is designated (step S703). When it is determined that the REC view is not designated, the REC view display is terminated after a certain period of time (step S707). When it is determined that the REC view hold is designated in step S703, the REC view display is continued, and it is determined whether the two (plural) image display mode is designated (step S704). In step S704, when it is determined that the two (plural) image display mode is not designated, the process waits until a designation to terminate the REC view hold, and when the REC view hold is terminated, the REC view display is terminated. When it is determined that the two (plural) image display mode is designated, two (plural) images are displayed (step S705). Then, a user performs operations such as enlarging and moving an image as described in the above embodiment to check the images. After the REC view hold is terminated (Yes in step S706), the REC view display is terminated (step S707).

Further, by previously setting a mode for displaying two (plural) images (multi display mode) during the REC view hold mode, the above group of images is automatically displayed during the REC view mode.

Figure 7:
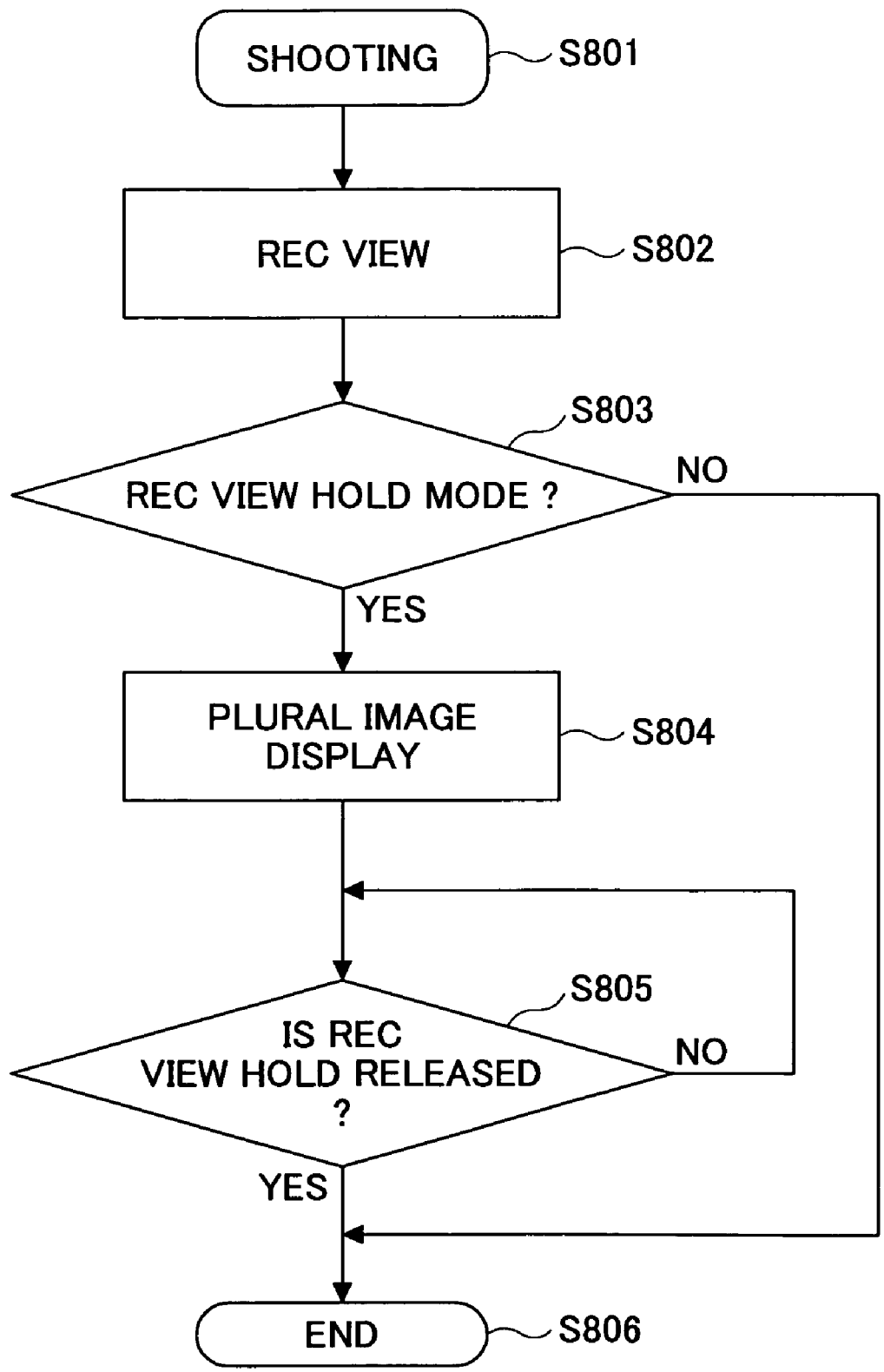
FIG. 7 is a flowchart showing a process of automatically displaying plural images of a image group in a REC view hold mode.

FIG. 7 is a flowchart showing an operational process of displaying two (plural) images in the "REC view hold" mode when the multi display mode is previously set. First, as soon as a shooting starts (step S801), a REC view display displaying the shot image data on the image display section 28 is performed (step S802). While the REC view display is being performed, it is determined whether the REC view hold is designated (step S803). When it is determined that the REC view hold is not designated, the REC view display is terminated after a certain period of time (step S806). When it is determined that the REC view hold is designated in step S803, the REC view display is continued and two (plural) images are displayed (step S804). Then, a user performs operations such as enlarging and moving an image as described in the above embodiment to check the images. After the REC view hold is terminated (Yes in step S805), the REC view display is terminated (step S807).

It should be noted that the operations of the above described embodiment of the present invention are performed in a manner so that the system controlling circuit 50 controls the memory controlling circuit 22, the image display memory 24, the memory 30 and the like.

As described above, according to an embodiment of the present invention, a detailed comparison between images having a similar composition can be easily made on site after the images are shot with a digital camera. Further, when the enlarging and moving operations are necessary with respect to two (plural) images, a single operation applies to the exact area in each image simultaneously, thereby improving the convenience of use. Still further, one operation applied to each image is applicable not only in the play mode for normal image comparison but also in the REC view mode right after shooting the images, thereby allowing efficient use of recording media and reducing labor-hours in handling the images afterward.

Embodiment 2

Figure 8:
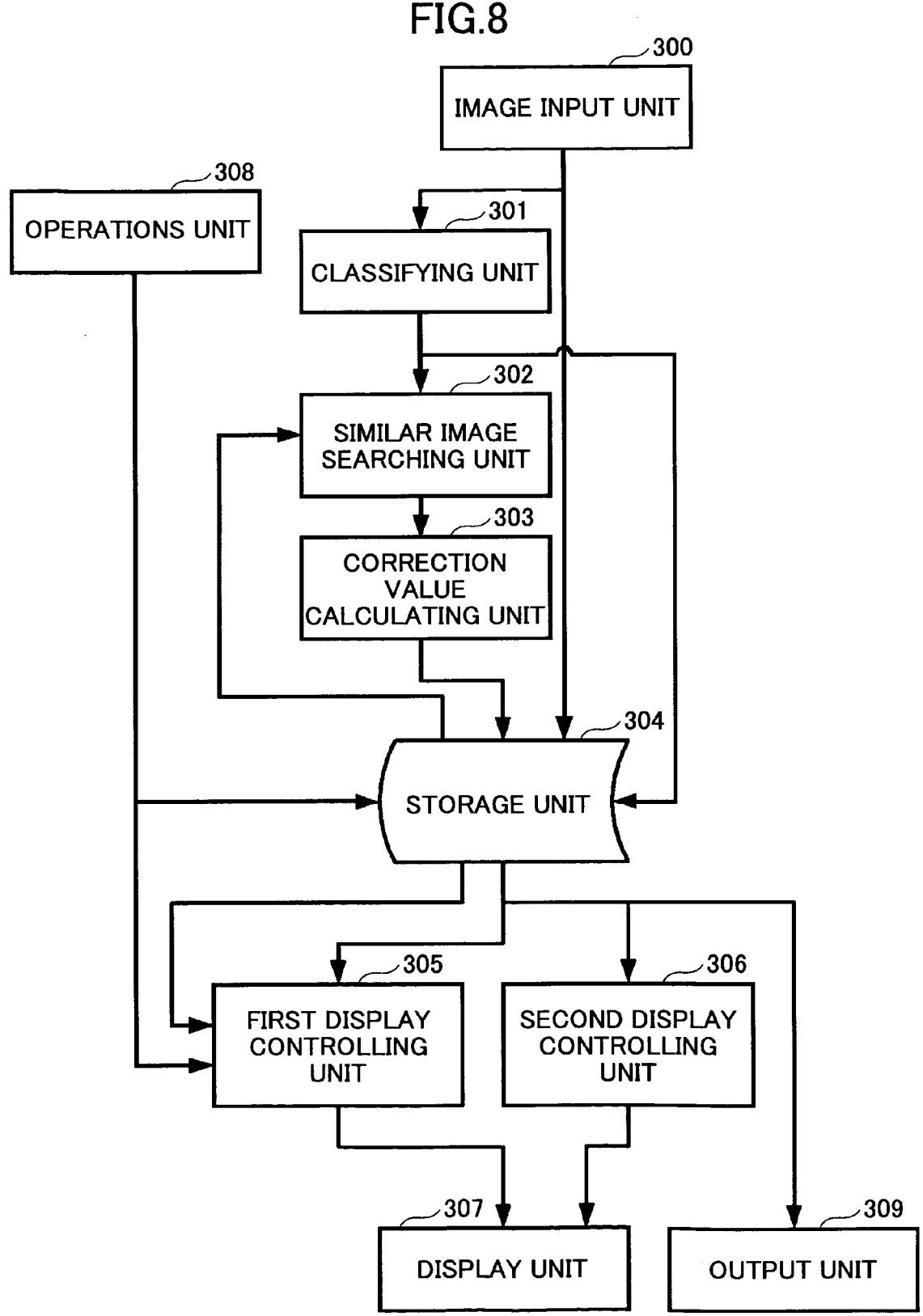
FIG. 8 shows an exemplary configuration according to a second embodiment of the present invention.

Next, a Multi Function Printer (hereinafter referred to as an MFP) according to an embodiment of the present invention is described. FIG. 8 is a drawing schematically showing an exemplary configuration of the MFP. The MFP includes an image input unit 300, a classifying unit 301, a similar image searching unit 302, a correction value calculating unit 303, a storage unit 304, a first display controlling unit 305, a second display controlling unit 306, a display unit 307, an operations unit 308, and an output unit 309. The image input unit 300 inputs an image via, for example, a flat bed scanner and a network. The storage unit 304 stores the input images. The display unit 307 lists the images stored in the storage unit 304 and selects images to be output. The output unit 309 reads and outputs the images stored in the storage unit 304.

In this embodiment, it is assumed that the storage unit 304 has a folder structure as shown in FIG. 9 to classify images to be stored.

In this embodiment, it is assumed that an image is input by a flat bed scanner. A user designates a resolution and starts scanning an image through the operations unit 308. Then the gray-scale information of the input image is converted into an analog signal. The analog signal is further converted into a 8-bit (256-value) digital signal via a A/D converter. In the following, a term "an image" refers to a digitized gray-scale signal.

When an image is input, the classifying unit 301 determines whether the input image is a document image. When it is determined that the input image is not a document image, the input image is stored in the "other" folder shown in FIG.

9. The classification process is performed by compressing an image without changing the aspect ratio of the image so that the compressed image fits inside a 600×600 pixel rectangle, and inputting the compressed image into a Support Vector Machine (SVM, see Non Patent Document 1) that has learned a value of each pixel.

The SMV is a classifier outputting "1" when the inner product between the input vector (600×600 dimensional vector, in this embodiment) and a weight vector "ω" exceeds a prescribed threshold value and otherwise, outputting "−1". The learning in SVM is a process of determining the weight vector "ω" and a threshold value "h".

$$\text{sign}[\omega x - h] \quad (3)$$

$$\sum_{i=1}^{N} \alpha_i t_i = 0 \quad (4)$$

$$0 \leq \alpha_i \leq \gamma, i = 1, \ldots, N$$

$$L_D(\alpha) = \sum_{i=1}^{N} \alpha_i - \frac{1}{2} \sum_{i,j=1}^{N} \alpha_i \alpha_j y_i y_j K(x_i, x_j) \quad (5)$$

$$\omega = \sum_{i \in S} \alpha_i t_i x_i \quad (6)$$

$$h = \omega x_0 - t_0 \quad (7)$$

$$K(x_i, x_j) = \exp(-C \|x_i - x_j\|^2) \quad (8)$$

Figure 14:
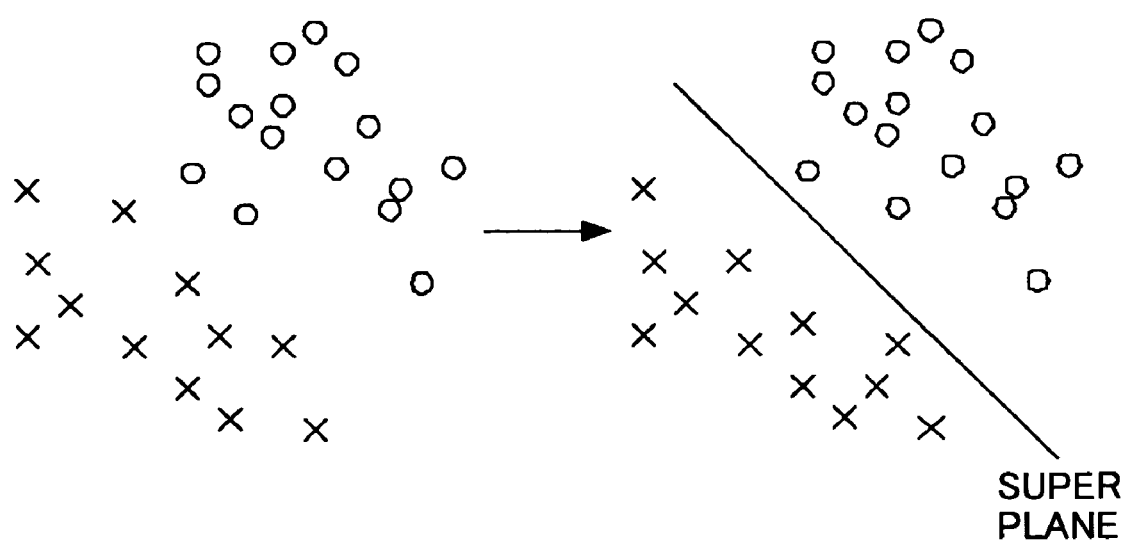
FIG. 14 is a drawing showing an operation of SVM.

Though detailed explanation of the learning in SVM is provided in Non Patent Document 1, the outline of the learning of the SVM is described below. FIG. 14 is a drawing schematically showing the operation of the SVM. First, it is assumed that there are two vector groups ("○" and "X") as shown on left-hand side of FIG. 14. The learning in SVM may refer to an algorithm for determining a super plane (see right-hand side of FIG. 14) appropriately dividing those two classes. In the learning algorithm in SVM, the term "appropriately dividing two vector groups" is equivalent to a maximize response capability or generalization capability when an unknown vector is input. To realize the capability, a Support Vector in a boundary position of the two vector group is found, and the super plane is set so that a distance between the Super Vector and the super plane. In an actual operation, however, there may be wrong teacher data, so that it is necessary to determine a parameter for error tolerance amount (soft margin). The above description is for linear SVM, and the actual teacher vector is not limited to a vector group that can be linearly classified. However, a nonlinear case can be dealt with by projecting a feature vector in higher order space (kernel trick) and searching for a super plane in the space.

As a result, to realize the above, a Lagrangian multiplier vector αi is used that maximizes formula 5 using teacher data (xi, yi) under the conditions of formula 4. Then, the parameters "ω" and "h" are obtained by using teacher data group "S" (this becomes a Support Vector) corresponding to an element other than "0" among the elements of the Lagrangian multiplier vector αi and one arbitrary teacher data element (x0, y0) of the teacher vector group "S" (see formulas 6 and 7).

It should be noted that in the above formula, an expression "K(x,y)" refers to a Kernel function for realizing the Kernel trick. Though there are provided various kernel functions, a Radial Basis Function (RBF) is used in this embodiment. The RBF is a function as shown in formula 8, where a symbol "C" refers to an arbitrary figure.

As described above, to perform the learning in SVM, it is necessary to set a parameter "γ" for an acceptable amount of the soft margin and a value "C" for determining the RBF which is a Kernel function. In this example, values of γ=1, C=1000 are used.

Further, in this embodiment, an image is compressed and used as an input vector. However, a feature amount may be calculated from the image and the calculated feature amount may be used as the input vector. When the dimensions of the vector are reduced by calculating the feature amount of the vector, faster operation of the SVM can be achieved and the number of the teacher data sets necessary for the learning can be reduced.

Referring back to FIG. 8, the similar image searching unit 302 determines a similarity level between an image in a document folder of the storage unit 304 and an input image. When there is an image having a high similarity level with the input image, the input image is stored in the same folder as the image having the high similarity level. On the other hand, when there is no image having a high similarity level with the input image, a new folder is created and the input image is stored in the created folder. It should be noted that the processes after the similar image searching unit 302 are performed only when it is determined that the input image is a document image. By doing this, the frequency of performing the similar image search is reduced and the speed of processing an input image is increased. Further, it is assumed that only one image from each folder under the document folder (see FIG. 9) is used as an image in the storage unit 304 to be compared by the similar image searching unit 302. This is because it is already determined that images in the same folder have high similarity level to each other. Therefore, it is not significant to compare the input image with plural images in the same folder. By reducing the number of images to be compared with an input image, the speed of processing an input image is increased.

Figure 13:
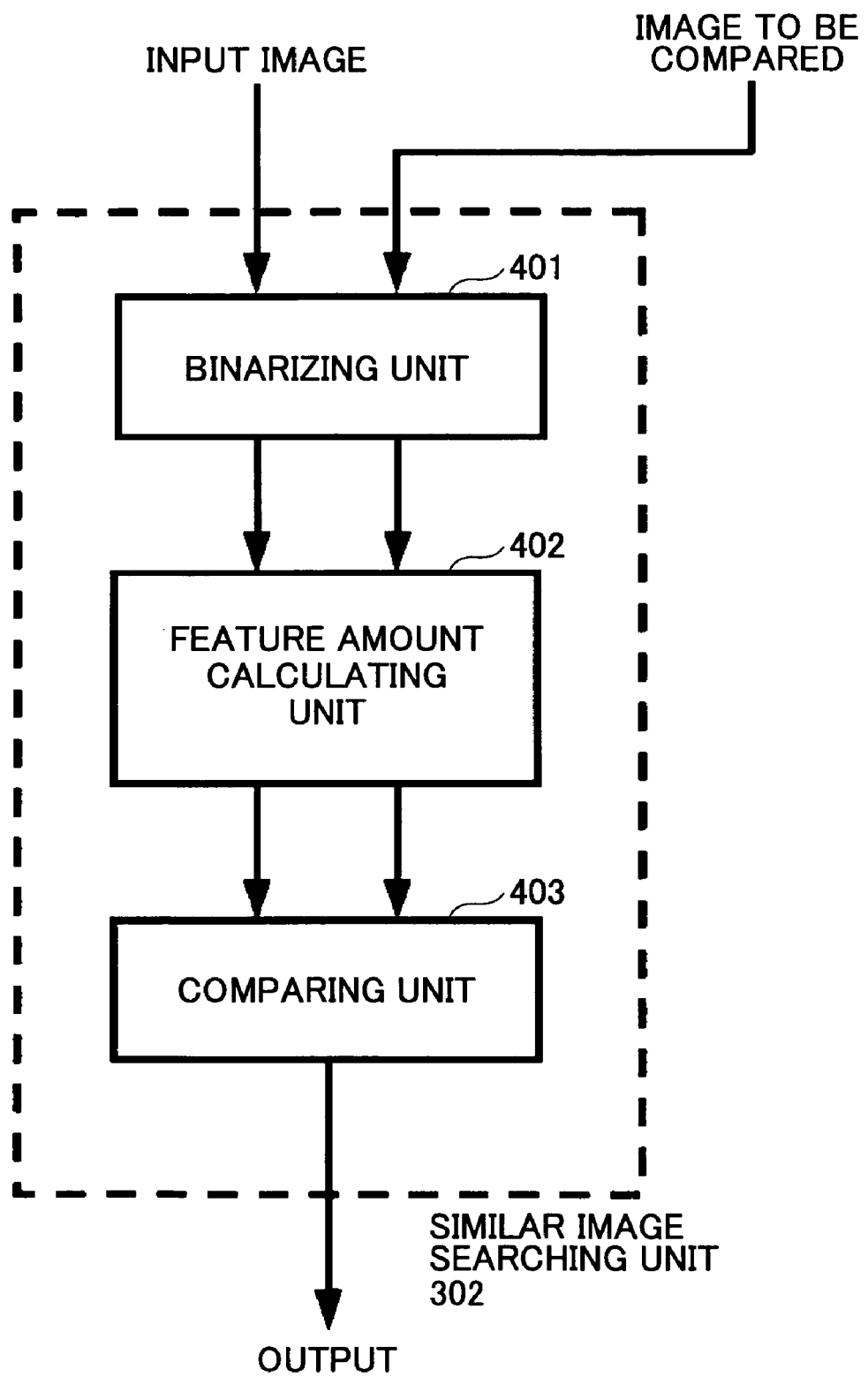
FIG. 13 illustrates an exemplary configuration of a similar image searching unit.

As shown in FIG. 13, the similar image searching unit 302 includes a binarizing unit 401, a feature amount calculating unit 402, and a comparing unit 403. The binarizing unit 401 binarizes images to be compared with each other. The feature amount calculating unit 402 calculates a feature amount called higher-order local autocorrelation as described in Non Patent Document 2 for each of the images. The comparing unit 403 determines whether an Euclidean distance between the calculated feature amounts of the images exceeds a prescribed threshold value. In this embodiment the threshold value is set at 20.

Detailed explanation of the higher-order local autocorrelation extraction method is described in Non Patent Document 2. Therefore, an outline of the method is described below. For simplicity purposes, a one-dimensional signal is considered. Then, an Nth autocorrelation function is defined as formula 9 with respect to N number of displacements (a1, a2, . . . , aN) when a luminance value of an image at an reference point "r" is given as "I(r)"

$$x(a_1, \Lambda, a_n) = \int I(r) I(r+a_1) \Lambda I(r+a_N) dr \quad (9)$$

In the higher-order location autocorrelation, a signal of the autocorrelation function is extended to two dimensions. In this case, the number of orders "N" is limited to 2, and a range of the displacements is also limited to a local 3×3 pixel area near the reference point "r".

Figure 12:
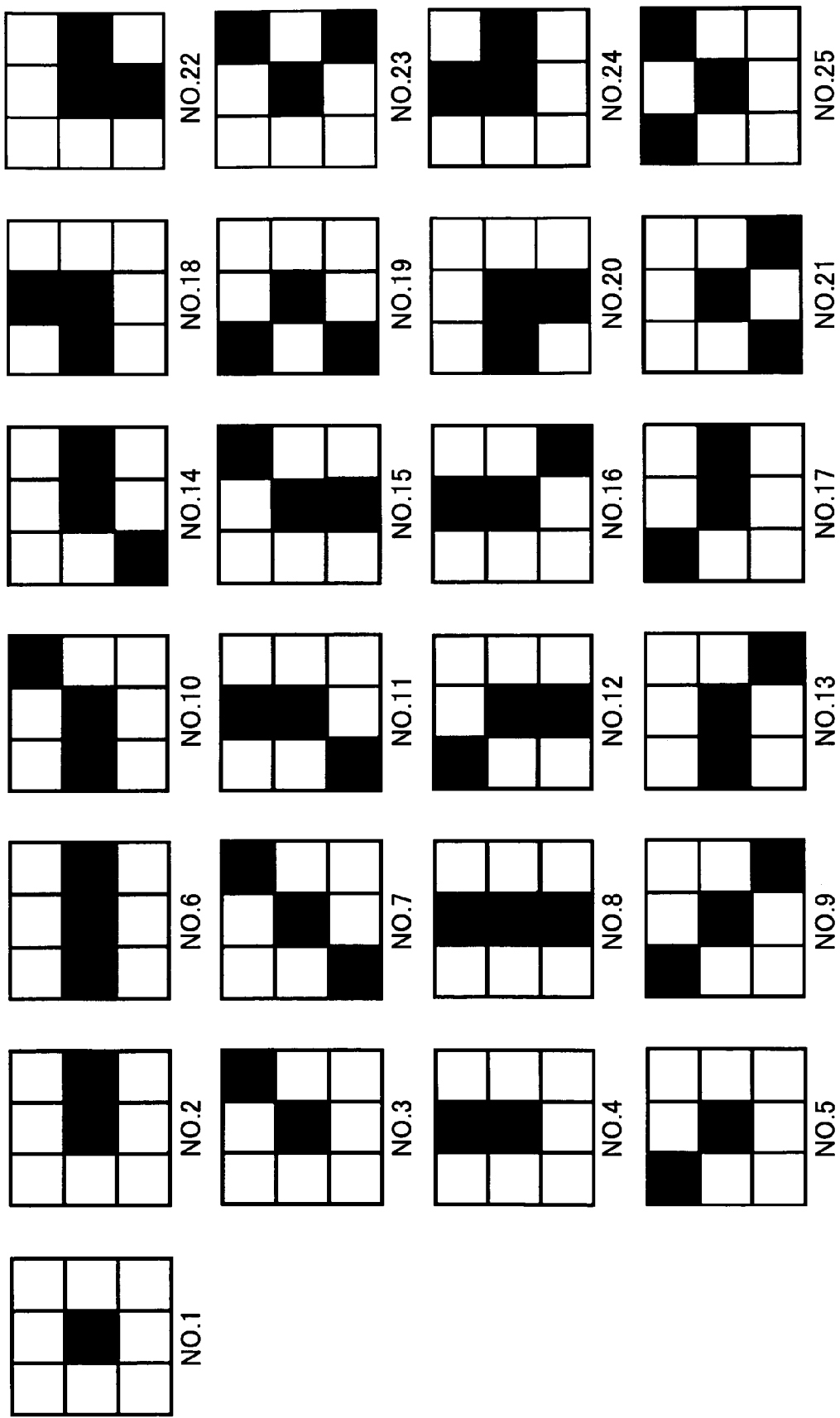
FIG. 12 shows patterns of higher-order local autocorrelation.

To explain more specifically, a case of a pattern in No. 2 of FIG. 12 is described as an example. A center pixel of the pattern is a noticed pixel. A multiplication is made between the noticed pixel and a right-hand black pixel in this case as a pixel related to the noticed pixel. Noticed pixels are scanned across the entire image and each multiplication result is accumulated to calculate the feature amount of No. 2. As described above, to calculate the higher-order local autocorrelation, up to two orders of correlation of pixels in a 3×3 pixel area is considered. Therefore, when equivalent features due to by parallel displacement are removed, the number of all patterns becomes 25 as shown in FIG. 12. Since each feature amount as described above of the 25 patterns is calculated, the feature amounts become a 25-dimensional vector. Further, since the obtained value changes according to the number of pixels in an image, the obtained feature amounts are normalized by dividing by all pixels included in an image. It is known that the feature amount obtained as described above is a kind of frequency information of the image and the feature amount value is unchanged when the position of the object image is moved but the contents are unchanged between images.

The correction value calculating unit 303 performs its operation when there is a similar image, and calculates a correction value so that the positions of the searched for and found images correspond to those of the input image. This calculation is performed with a method similar to that performed by the correction value calculating unit 503 described in the first embodiment. However, in the first embodiment, an image including in an area "R0" enlarged from the first image by a user is searched for in the second image. On the other hand, in this second embodiment, a position (cx, cy) having the highest correlation value is calculated by scanning the entire first image. In this case, as described above, the first image may be directly scanned. However, when the first and the second images are compressed to "1/n" size, the position (cx, cy) having the highest correlation value is calculated; then (cx, cy) is multiplied by "n" to obtain (n×cx, n×cy), so that the process can be performed faster. Further, the size of an input image varies according to the resolution set by a user. Therefore, before the correction value calculating unit 303 performs its process, an input image is enlarged or compressed so as to have a prescribed resolution value. In this example of this embodiment, it is assumed that all images are enlarged or compressed so as to be a 300 dpi images. Further, an enlarge correction rate "c" defined as "300/a" where reference numeral "a" is a resolution value of an input image is calculated. The calculated (c'x, c'y) and "c" are stored in the storage unit 304 with the corresponding image as a data pair. As described above, when an image is scanned, it is necessary to designate a resolution value. However, the resolution value may differ depending on the preference of users. However, by calculating the enlarge correction rate "c" as well as calculating and storing the correction value of the position, a user doesn't need to select a specific resolution value when scanning an image, thereby improving the convenience of use.

The image stored in the storage unit 304 can be displayed as a list by the display unit 307. A user can change the images to be displayed as a list and select an output image through the operations unit 308. In this embodiment, a touch panel is assumed to be used as the operations unit 308. On the display unit 307, an enlarge/compression rate and paper size and the like are normally displayed. However, when a specific button is pressed, an image as shown in FIG. 9 is displayed. In the display, when, for example, the "ID001" folder is selected through the touch panel, an image in the "ID001" folder is transmitted to the first display controlling unit 305 and the second display controlling unit 306. In the first display controlling unit 305, a specific area of the image is cut off and transmitted to the display unit 307. On the other hand, in the second display controlling unit 306, the entire image is compressed and the compressed image is transmitted to the display unit 307. Above processes are performed on all the images in the folder. It should be noted that prescribed values may be used for the enlarged position and the enlarge rate. However, a folder and an enlarged area used by a previous user may be used. It is assumed that when reference values of the cut off area are given as (xl, yb, xr, yt), the area cut off from each image with respect to the "c" and "(cx, cy)" corresponding to the each image is given as (xl+cx, yb+cy, xr+cx, yt+cy).

Figure 10:
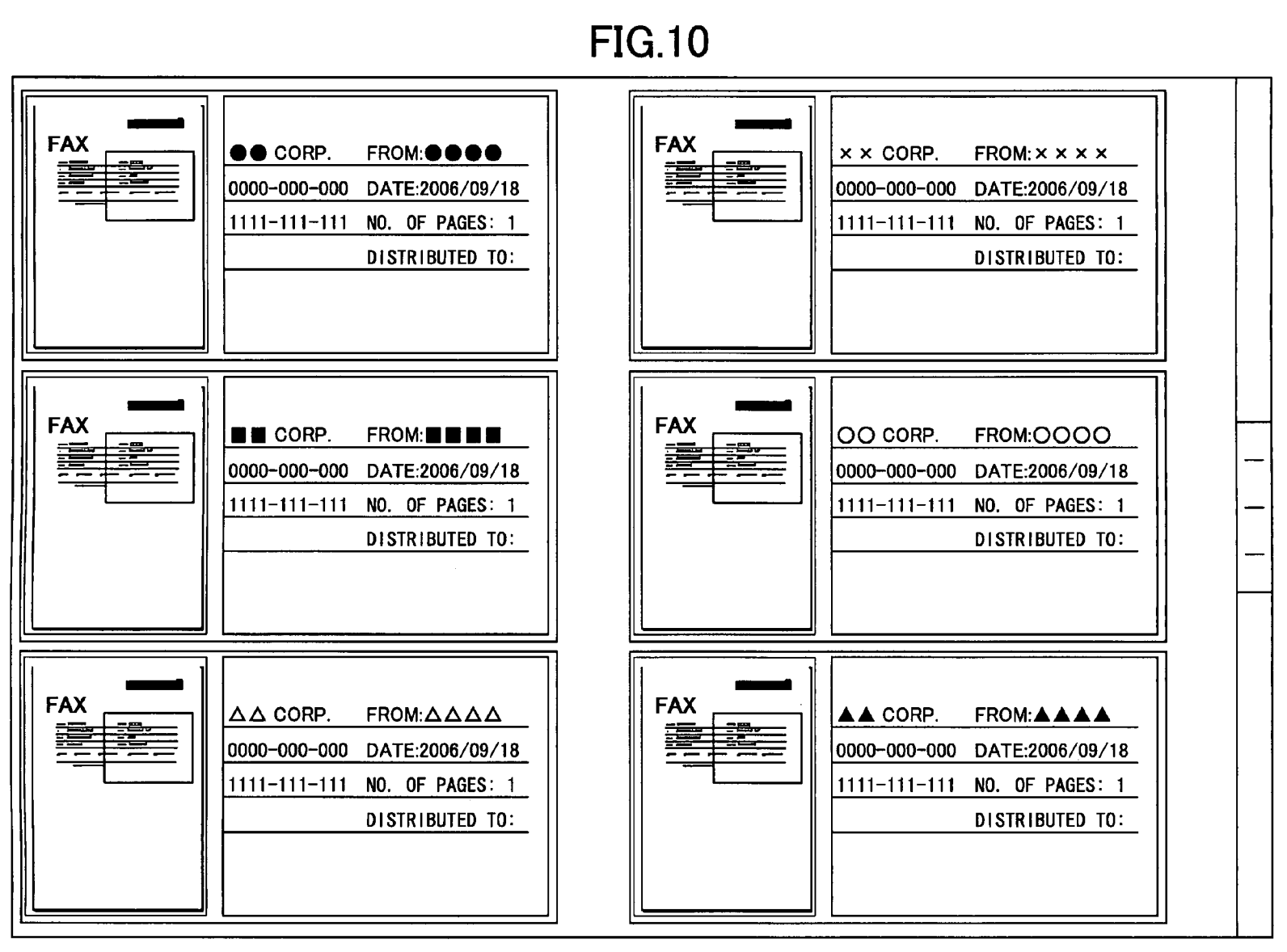
Figure 11:
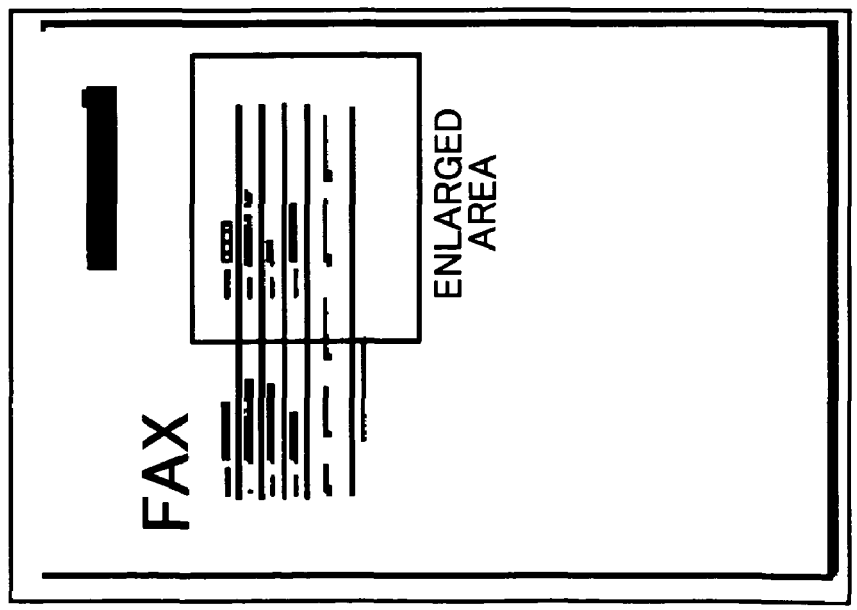
FIG. 11 is a drawing showing an image created by enlarging the left-upper image in FIG. 10.

As a result, a display as shown in FIG. 10 is displayed on the display unit 307. Compressed images (processed by the second display image 306) and partially enlarged areas (images processed by the first display controlling unit 305) with respect to six images are displayed. In the display, when a slide bar on the right side is used, more than six images can be easily seen by sliding the images upward and downward. For more detailed description, FIG. 11 shows an enlarged image of the left upper side of the display in FIG. 10. FIG. 11 shows a compressed image of the entire input image on the left-hand side and a partial enlargement of the image on the right-hand side (side by side). Further, a rectangle shown in the left-hand-side image indicates an area to be enlarged in the right-hand-side image. This arrangement allows a user to easily recognize which area is enlarged and displayed, thereby improving the convenience of use.

A user can enlarge or shrink the enlarged area by dragging the right bottom of the enlarged area on the touch panel. Further, a user can move the position of the enlarged area by dragging any position on the enlarged area other than the right bottom position. These operations are transmitted to the first display controlling unit 305. In this case, each image in the folder is transmitted from the storage unit 304 to the first display controlling unit 305. The first display controlling unit 305 cuts off the area to be enlarged designated by the user and transmits the cut-off image to the display unit 307. By doing this, enlarged images with respect to all the displayed images are displayed based on the area to be enlarged designated by the user. As described above, since not only is the enlarged area explicitly indicated on the compressed image but also the area to be enlarged can be enlarged and shrunk by directly manipulating the rectangular area on the display, a user can intuitively enlarge and shrink and move the position of the area to be enlarged, thereby improving the convenience of use.

As described above, when a user performs the same operation performed on one image with respect to an area to be enlarged in the other images as well, the noticed area in all the other images can be accurately enlarged by correcting the differences of position and the enlarged rate of the area to be enlarged. Without performing such corrections, the user has to make a fine adjustment on each image or scan each image after an accurate positioning process and set a predetermined resolution when scanning images.

It should be noted that all or a part of the processes preformed by the classifying unit 301, the similar image searching unit 302, and the correction value calculating unit 303 are not necessarily performed right after an image is input. For example, an image may be read from the storage unit 304 and be processed while no other jobs are running. The processes described above may require a long time depending on how the processes are implemented. In such as case, a user has to wait for scanning one image to another. However, when all or a part of the above process is arranged to be performed while no other jobs are running on an MFP, or, for example, during other than business hours, the user doesn't have to wait for completing the processes, thereby improving the convenience of use.

Still further, in this embodiment, the entire image is shrunk by using the second display controlling unit 306 and the shrunken image is displayed on the display unit 307. However, when, for example, an image format capable of storing low-resolution images such as JPEG 2000 is used, it is not necessary to perform a separate shrinking process.

Still further, each of the above embodiments is realized by providing a storage medium (or recording medium) storing program code of software, capable of realizing functions according to an embodiment of the present invention as described above, in a system or an apparatus, and reading and executing the program code stored in the storage medium by a computer (or a CPU and an MPU) of the system or the apparatus. In this case, the program code itself read from the storage medium and executed realizes the functions of the embodiment of the present invention, and the storage medium storing the program code constitutes an embodiment of the present invention. Further, when a computer executes the loaded program code, the described embodiment of the present invention is performed, and based on the instructions from the program code, an operating system (OS) running on the computer performs all or a part of the actual processes to realize the above described functions of an embodiment of the present invention. This case is also included in an embodiment of the present invention.

Still further, an embodiment of the present invention includes a case where program code loaded from a storage medium is written in a function extension card of a computer or a memory as a function extension unit connected to the computer, and a CPU included in the function extension card or the function extension unit performs all or a part of the actual processes, thereby realizing the functions of an embodiment of the present invention.

When an embodiment of the present invention is applied to the storage medium, program code corresponding to the steps described above is stored in the storage medium.

The present invention is not limited to the above embodiments, and variations and modifications may be made without departing from the scope of the present invention.

The present application is based on and claims the benefit of priority of Japanese Patent Application No. 2007-124467, filed on May 9, 2007, the entire contents of which are hereby incorporated herein by reference.

What is claimed is:

1. An image processing apparatus comprising:
   an image input unit inputting an image;
   a recording unit recording the image input by the input image unit;
   a display unit displaying the image recorded in the recording unit;
   a first display controlling unit simultaneously performing a process selected from the group including enlarging an image and moving an image with respect to specific plural of the images displayed on the display unit; and
   a correction value calculating unit calculating a correction value with respect to the process in the first display controlling unit in accordance with the selected process; wherein
   the process in the first display controlling unit is corrected in accordance with the correction value.

2. The image processing apparatus according to claim 1, wherein
   the correction value calculated by the correction value calculating unit is first recorded in the recording unit and read when a corresponding image is processed in the first display controlling unit.

3. The image processing apparatus according to claim 1, further comprising:
   an operations unit transmitting an instruction from a user to the apparatus, wherein
   the operations unit reads an image from the recording unit in accordance with a user's operation, and
   the operations unit controls the first display control unit in accordance with a user's operation.

4. The image processing apparatus according to claim 1, further comprising:
   an imaging unit imaging an image, wherein
   the first display controlling unit has a function to perform a REC view operation displaying the image imaged by the imaging unit right after an imaging operation by the imaging unit, and
   when receiving an instruction to continue the REC view operation, the specific plural images are automatically displayed on the display unit.

5. The image processing apparatus according to claim 1, wherein
   the plural images are any of plural images sequentially shot in a bracket shooting, plural images shot in a sequential shooting, and plural images shot within a prescribed period of time.

6. The image processing apparatus according to claim 1, further comprising:
   an image similarity level calculating unit calculating a similarity level of an image recorded in the recording unit, wherein
   the correction value is calculated using an image determined to have a high similarity level with at least the input image.

7. The image processing apparatus according to claim 1, wherein the correction value calculating unit includes an enlargement ratio correction value calculating unit.

8. The image processing apparatus according to claim 1, further comprising:
   a second display controlling unit processing an image, wherein
   all or a part of the images read from the recording unit are transmitted to the first display controlling unit and the second display controlling unit, and
   an image processed by the first display controlling unit and another image processed by the second display controlling unit are simultaneously displayed on the display unit.

9. The image processing apparatus according to claim 8, wherein
   the second display controlling unit outputs an image having lower resolution than the image input to the second display controlling unit.

10. The image processing apparatus according to claim 8, wherein,
    a correspondence between the two images processed by the first display controlling unit and the second display controlling unit, respectively, is clearly displayed in a rectangle on at least one of the images.

11. The image processing apparatus according to claim 10, wherein
    an operation performed by the first display controlling unit is changed and contents displayed on the display unit are updated by an operation of pointing and dragging the rectangle displaying the correspondence between the two images.

12. The image processing apparatus according to claim 1, further comprising:
    a classifying unit determining a type of the image.

13. The image processing apparatus according to claim 12, wherein following processes are switched depending on whether a type of the image is a prescribed type determined by the classifying unit.

14. The image processing apparatus according to claim 12, wherein
   the classifying unit determines a type of the image before determining a similarity level.

15. An image processing method comprising:
   an image input step of inputting an image;
   a recording step of recording the image input by the input image unit;
   a display step of displaying the image recorded in the recording unit;
   a first display controlling step of simultaneously performing a process selected from the group including enlarging an image and moving an image with respect to specific plural of the images displayed on the display unit; and
   a correction value calculating step of calculating a correction value with respect to the process in the first display controlling unit in accordance with the selected process;
   wherein the process in the first display controlling unit is corrected in accordance with the correction value.

16. The image processing method according to claim 15, wherein
   the correction value calculated by the correction value calculating unit is first recorded in the recording unit and read when a corresponding image is processed in the first display controlling unit.

17. A tangible computer-readable medium having encoded thereon a computer program causing a computer to perform the image processing method according to claim 15.

18. A computer-readable recording medium storing a program causing a computer to perform the image processing method according to claim 15.

* * * * *